US006847888B2

(12) United States Patent
Fox et al.

(10) Patent No.: US 6,847,888 B2
(45) Date of Patent: Jan. 25, 2005

(54) METHOD AND APPARATUS FOR GEOGRAPHIC SHAPE PRESERVATION FOR IDENTIFICATION

(75) Inventors: Jason Fox, Thousand Oaks, CA (US); Michael J. Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 10/383,377

(22) Filed: Mar. 6, 2003

(65) Prior Publication Data

US 2004/0030492 A1 Feb. 12, 2004

Related U.S. Application Data

(60) Provisional application No. 60/401,923, filed on Aug. 7, 2002.

(51) Int. Cl.[7] .......................... G01C 21/32; G06F 17/30; G06F 17/00
(52) U.S. Cl. ........................ 701/208; 701/212; 707/100
(58) Field of Search ................................. 701/207, 208, 701/212; 707/100, 102, 104.1; 382/113, 294; 345/661, 855, 839, 854, 619, 660, 853

(56) References Cited

U.S. PATENT DOCUMENTS

| | | | |
|---|---|---|---|
| 4,675,676 A | 6/1987 | Takanabe et al. ............ 340/995 |
| 4,686,580 A | 8/1987 | Kato et al. .................. 358/287 |
| 4,872,064 A | 10/1989 | Tutt et al. ................... 358/464 |
| 5,030,117 A | 7/1991 | Delorme ...................... 434/130 |
| 5,379,215 A | 1/1995 | Kruhoeffer et al. ......... 364/420 |
| 5,384,904 A | 1/1995 | Sprague et al. ............. 395/139 |
| 5,386,509 A | 1/1995 | Suzuki et al. ............... 395/162 |
| 5,418,906 A | 5/1995 | Berger et al. ............... 395/161 |
| 5,485,563 A | 1/1996 | Fisher ........................ 395/139 |
| 5,528,733 A | 6/1996 | Luttmer ...................... 395/107 |
| 5,544,294 A | 8/1996 | Cho et al. ................... 395/141 |
| 5,638,523 A * | 6/1997 | Mullet et al. ............... 345/855 |
| 5,652,717 A | 7/1997 | Miller et al. ................ 364/578 |
| 5,864,632 A * | 1/1999 | Ogawa et al. ............... 382/113 |
| 6,012,014 A * | 1/2000 | Koyanagi et al. ........... 701/208 |
| 6,052,645 A | 4/2000 | Harada ........................ 701/212 |
| 6,104,410 A | 8/2000 | Wong .......................... 345/440 |
| 6,308,177 B1 * | 10/2001 | Israni et al. ................. 707/100 |
| 6,691,128 B2 * | 2/2004 | Natesan et al. ............. 707/102 |
| 6,732,120 B1 * | 5/2004 | Du ............................ 707/104.1 |

OTHER PUBLICATIONS

Edelsbrunner, H., et al., "A Combinational Approach to Cartograms," pp. 98–108 (May 6, 1995).

Sarkar, M., et al., "Graphical Fisheye Views," *8070 Communications of the ACM*, vol. 37, No. 12, pp. 73–84 (Dec., 1994).

Du, C., et al., "Constructing Contiguous Area Cartogram Using Arcview Avenue," *Geoinformatics and Socioinformatics, The Proceedings of Geoinformatics '99 Conference*, Ann Arbor, pp 1–7 (Jun. 19–21, 1999).

House, D. H., et al., "Continuous Cartogram Construction," Texas A&M Univ., 7 pages total, date is not available.

Keahey, T.A., "Area–Normalized Thematic Views," *Ottawa ICA/ACI 1999 Proceedings/Actes, Design and Production*, Session 28–A, 10 pages total, (1999), month is not available.

* cited by examiner

*Primary Examiner*—Tan Q. Nguyen
*Assistant Examiner*—Dalena Tran
(74) *Attorney, Agent, or Firm*—Ladas & Parry LLP

(57) ABSTRACT

A method for transforming a map based on associated geospatial data. A map is segmented into logical segments representing map-based entities. The geospatial data is then associated with the logical segments. The logical segments are scaled based upon the associated data. The logical segments are then repositioned to avoid overlapping other logical segments and a new map display based on the scaled and repositioned logical segments is provided.

21 Claims, 5 Drawing Sheets

METHOD AND APPARATUS FOR GEOGRAPHIC SHAPE PRESERVATION FOR IDENTIFICATION

CROSS-REFERENCE TO RELATED APPLICATIONS

This application is related to and claims benefit of U.S. Provisional Application 60/401,923 filed on Aug. 7, 2002, which is incorporated herein by reference in its entirety.

BACKGROUND

1. Field

The present invention relates to representation of geospatially-based data and, more specifically, enhancement of the representation of such data to improve the understanding of such data.

2. Discussion of Related Art

A geographic information system is an information system designed to associate data of various types with spatial or geographic coordinates. Typically, a geographic information system displays data overlaid on some type of map showing geographic or political boundaries. Hence, the geographic information system is slaved to an underlying map. Data are registered to geographic positions on various projections of the earth, such as Mercator, Hammer, Gnomic, or Eumorphic. However, in representing data on a standard map, misperceptions can arise, because visualizing data on a standard map inherently emphasizes regions with the greatest geographic area, while making the presentation of very small regions and the data associated with those small regions quite difficult.

One way in which to deal with the misperceptions caused by the sizes of the displayed geographic areas on a map is to "zoom in" on a specified portion of the map to see the displayed data in increased detail. "Zooming" or scaling displayed images is well known in the art. U.S. Pat. Nos. 4,686,580, 4,872,064, 5,384,904, and 5,485,563 disclose different techniques for scaling portions of an image or an entire image. The scaling techniques disclosed in these patents generally describe the uniform scaling of an image. Application of these techniques in a geographic information system application results in the scaling of selected regions of the displayed map in a uniform fashion. For example, if a map of the United States is displayed and the user elects to zoom in on the map area displaying California, Calif. and the areas surrounding it located within the zoom area, will be uniformly increased in size. The areas outside the zoom area will likely disappear from the display.

Geographic information systems providing for the display of geospatially-based data and providing for control of the size and resolution of the map underlying the data are also known in the art. U.S. Pat. No. 4,675,676, by Takanabe et al., discloses a vehicle map system that includes a control unit that manually or automatically enlarges or reduces the displayed map. Hence, as a vehicle comes closer to its desired destination, the displayed map is enlarged to show more of the details relating to the desired destination. U.S. Pat. No. 6,052,645, by Harada, also describes a vehicle map system in which a detailed map is displayed when a vehicle carrying the system approaches a specified location. Since the scaling used in the detailed maps is uniform, map information for areas outside the detailed map area is no longer displayed when the detailed map is displayed.

Implementations of geographic information systems may provide for several levels of scaling. Delorme describes, in U.S. Pat. No. 5,030,117, a digital global map generating system that provides a hierarchical map system that allows a user to progress from a first view of the world at a low resolution to segments of the world at increasingly higher resolutions. The map display is controlled such that the entire selected segment is displayed and the user can elect to either move up or down in the hierarchy by clicking on the display with a mouse or other pointing device.

As indicated above, registration of data to the underlying map is an important feature of geographic information systems. Miller et al., in U.S. Pat. No. 5,652,717, describe a technique for registering data from multiple sources with a geographic database and manipulating the data for display. Kruhoeffer et al., in U.S. Pat. No. 5,379,215, describe the registration of weather information with a terrain map to create a three-dimensional display. Berger et al., in U.S. Pat. No. 5,418,906, describe a method for converting data registered in one geographic information system database into another geographic information system by mapping the data in a specified geographic extent in the first GIS into the second GIS. A common feature of all these systems and methods is that the scale of the data displayed is uniform across the entire display. That is, a user will select a geographic area and the system will determine the appropriate display size and resolution to display the selected geographic area. Areas outside of the selected geographic area will not be shown to the user.

One type of map known in the art for relating underlying data to the size of displayed geographic or political boundaries is the area cartogram. The area cartogram scales areas within a map to conform to the data associated with the scaled area, while preserving, to some extent, the shape, orientation and contiguity of the scaled area. There are two types of cartograms: contiguous and noncontiguous. Both contiguous and noncontiguous cartograms are known in the art.

A contiguous cartogram is drawn so that the boundaries of the geographic or political units are tangent to one another. FIG. 1 shows an exemplary contiguous cartogram showing the population of the United States, with the size of each state representing the total population of that state. FIG. 1 also shows one of the major drawbacks with contiguous cartograms in that the shapes of the geographic or political units must be distorted to maintain common boundaries.

A non-contiguous cartogram is drawn so that the true geographic shapes of the geographic or political units are maintained after scaling the units. FIG. 2 shows an exemplary non-contiguous cartogram showing the population of the states of the southeastern United States. FIG. 2 also shows some of the major drawbacks of the non-contiguous cartogram: (1) the geographic or political units do not fit together to maintain the contiguous character of the original map and (2) the empty space between the units make it difficult to maintain the original shape of the area under study and to present it in a compact form.

A further limitation with both types of cartograms is that the scaling of the geographic or political units is normally based on a single data variable. The intent of a cartogram is to assist in the visualization of that data variable when it is coupled to geographic or political units. However, as noted above, the entire map area will be scaled based on that single variable. Hence, the representation of other data variables may be lost or underemphasized due to the cartogram scaling used for the first variable.

Geospatially-based data is often relevant only at a particular geographic scale, but at multiple locations. The data may, therefore, be widely distributed over a large geographic area and occur over long periods of time. Display of the data at a resolution that will allow the entire geographic area to be seen may result in the information display in informationally dense areas to be unreadable. Display of informationally dense areas using conventional geographical information systems may require users to perform multiple zoom functions to evaluate data at different locations at a high resolution or require that multiple displays be used. However, these methods may hide the geographic relationship between the areas in which the data is displayed. Analysts need advanced visualization techniques to correlate data associated as vastly different scales, distances, and times.

Hence, there is a need in the art for a method of generating maps with map entities sized according to data associated with the map entities, while maintaining shape and position relationships between the map entities. Further, there is a need in the art for providing this method in an automated fashion.

SUMMARY

An object of this invention is to provide a method for analysts to visually correlate information presented at different areas of a map. A further object of this invention is to display the information importance, information density, or other information feature by manipulating the map display.

These objects and others are provided by preferred embodiments of methods according to the present invention. The present invention provides that geospatial data is displayed based upon the automatic segmentation of map-based imagery by political and/or geographic boundaries. Each segment may then be scaled based on the information density within that segment. The segments are positioned to retain the shapes of the original imagery as much as possible. This unique form of distortion enhancement increases the space available for display of overlaid data, while preserving salient features, such as shape, context, and relative positions.

The present method provides that the geographic shapes of geographic entities are retained as much as possible, even though map displays are being transformed based on overlay data. Transformations according to the present invention enhance the understanding of the displayed data. Therefore, the present invention provides that the geospatial objects and data are the important features of the display, rather than the underlying maps. The specialized distortions used in the map transformations according to the present invention enhance an analyst's view of the data. The nonlinear magnification provides increased detail in areas with high information density, making it easier to correlate data at many scales. The segmentation of the maps according to the overlay data allows for distant data to be brought together for easy comparison. Thus, the present invention provides for a common operating picture for scale-dependent data and spatial comparison over large distances to provide decision makers the ability to make fast preliminary analyses.

One preferred embodiment of the present invention provides a method for enhancing the display of geospatially-based data on a map, wherein said geospatially-based data is associated with map-based entities, and the method comprises the steps of: specifying a hierarchy for the map-based entities shown on a map; segmenting the map into logical segments based on the hierarchy of map-based entities; associating the geospatially-based data with corresponding logical segments; calculating a corresponding scale factor for each logical segment; scaling each logical segment according to the corresponding scale factor; repositioning each logical segment to minimize intersections between each logical segment and any other logical segment; and displaying a map of the scaled and repositioned logical segments. Preferably, the logical segments comprise areas of pixels and the geospatially-based data is registered to pixels within the areas of pixels.

Another preferred embodiment according to the present invention provides a method for scaling a map based on associated overlay data, the method comprising the steps of: intersecting vector representations of a plurality of geographical or political entities with one or more raster images to create a plurality of logical data segments, each logical data segment corresponding to the vector representation of a corresponding geographical or political; linearly registering overlay data to each logical segment; calculating a corresponding data density for each logical segment; scaling each logical segment based on the corresponding data density for the logical segment; repositioning at least one logical segment in relation to another logical segment; determining whether any logical segment overlaps any other logical segment; and providing a map containing the scaled logical segments.

DETAILED DESCRIPTION

Traditionally, cartographers produce maps by projecting the polar coordinates of the Earth into a two or three-dimensional Cartesian representation, as indicated by the equation below:

$$\text{GeographicData} \rightarrow \text{Projection}(\sigma,\omega,r) \rightarrow \text{map}(x,y)$$

These projections are static and have few constraining factors that affect the resultant map. A common constraining factor is a minimum and maximum latitude and longitude that has the effect of limiting the region represented in the map to a country, state, or city. There is always a scale applied to the projection, making it a manageable size, such as 1:125000 or 1:500000.

Figure 1:
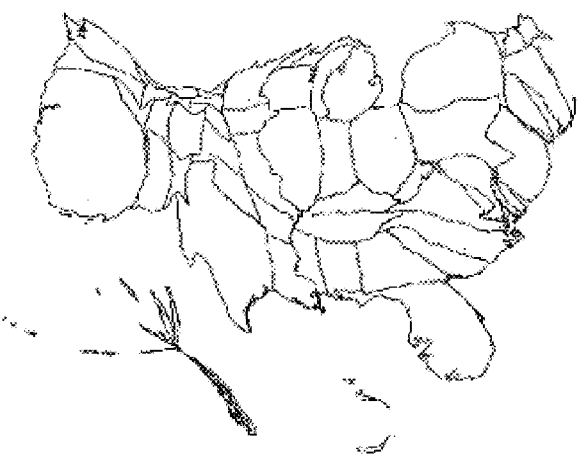
FIG. 1 (prior art) shows a contiguous cartogram representing the population of the United States.
Figure 2:
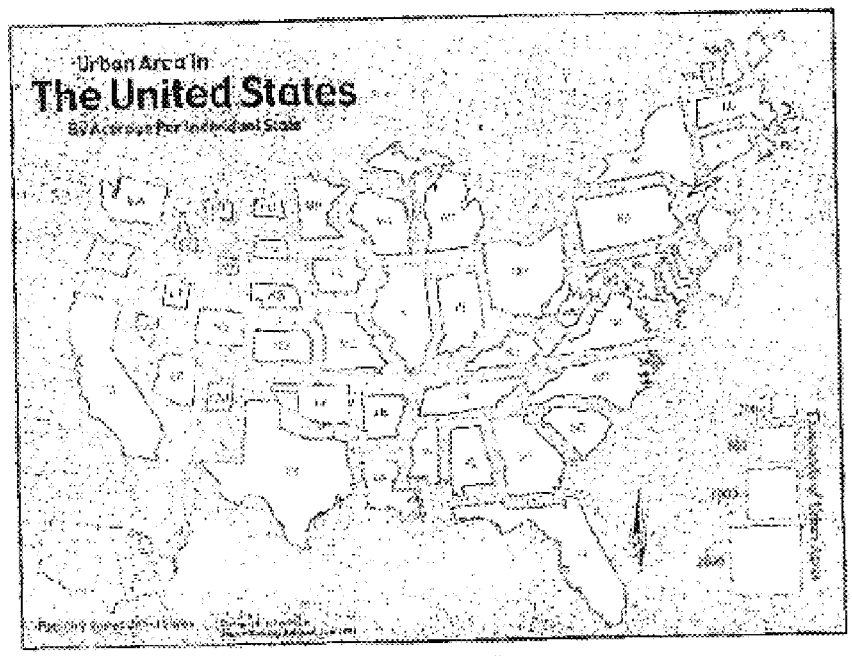
FIG. 2 (prior art) shows a non-contiguous cartogram representing the population of the southeastern United States.
Figure 3A:
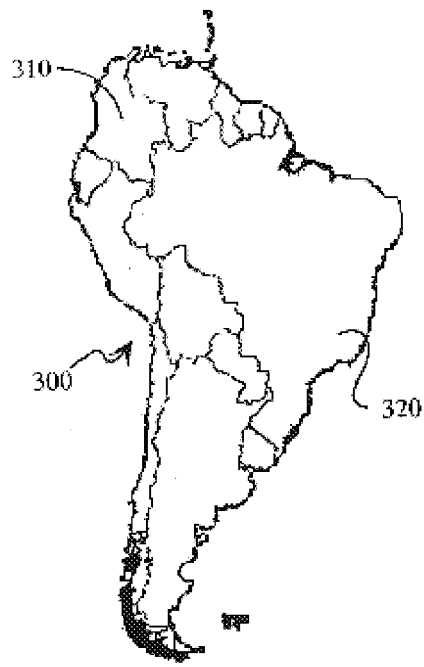
FIG. 3A shows a map of South America using a conventional transformation of polar coordinates to Cartesian coordinates.
Figure 3B:
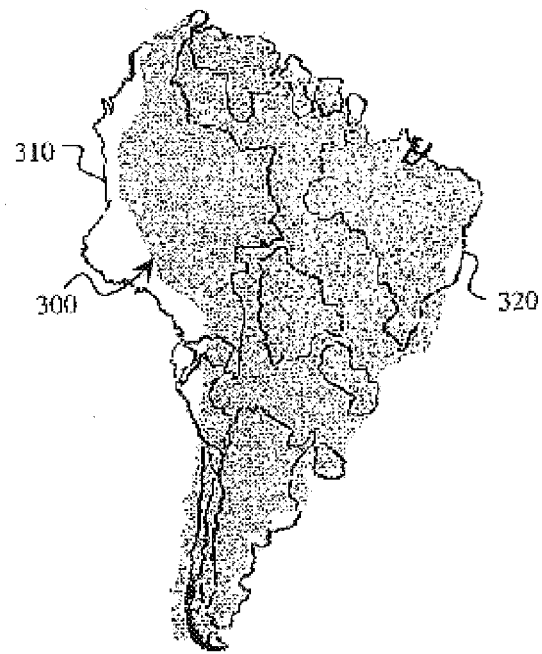
FIG. 3B shows a map of South America using a transformation according to an embodiment of the present invention.

Embodiments of the present invention introduce a supplemental transformation to the projection described above. The new transformation incorporates additional factors into the generation of a map, such as information density within bounded regions of the map. This enables regions to be transformed independent of each other. The transformation used by embodiments of the present invention may be represented by the equation shown below.

$$\text{GeographicData} \rightarrow \text{SupplementalTransformation}(\text{Projection}(\sigma,\omega,r), \epsilon) \rightarrow \text{map}(x,y)$$

where 68 represents a correction in the final step to limit the distortion of larger bounded regions in the hierarchy that contain the smaller, scaled regions FIG. 3A is a traditional map projection of South America 300 showing the borders of the South American countries, in particular, the boundaries of Columbia 310 and Brazil 320. FIG. 3B shows an example of a map projection of South America according to the present invention. In FIG. 3A, the polar to Cartesian transformation is applied uniformly across the geography. In FIG. 3B, one country, Columbia 310, is weighted more heavily than the rest of the region, because of high information density, high interest, or some other weighting metric. In FIG. 3B, the result is a map in which the region of interest, Columbia 310, is scaled larger, while the remaining regions, such as Brazil 320, are scaled smaller. As shown in FIG. 3B, the correction $\epsilon$ provides that South America continent is still recognizable despite large changes due to enhancement. One can see that the overall outline of the transformed countries shown in FIG. 3B is roughly equivalent in size and shape to the untransformed display of South America 300 (shown as the shaded region in FIG. 3B). Therefore, salient features, such as shape, context, and relative positions are maintained.

Figure 4:
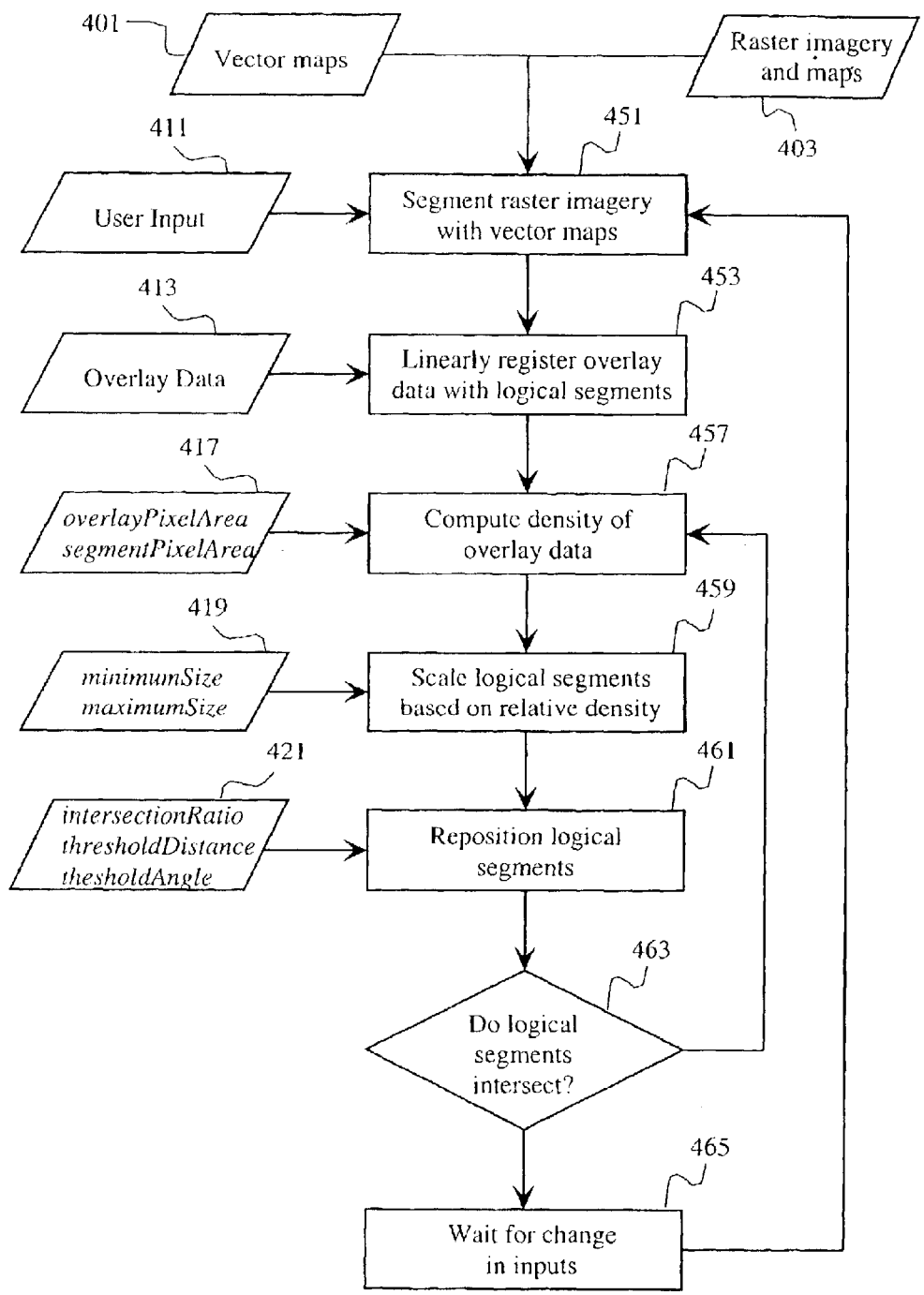
FIG. 4 shows a flow diagram of a preferred embodiment for a method of map transformation according to the present invention.

FIG. 4 is a flow diagram showing a preferred method for transforming a map according to the present invention. Preferably, the method would be implemented through the use of automated data processing equipment such as a computer with data storage capabilities and a graphics display. However, other embodiments of the method may be implemented through data processing hardware well known in the art, such as handheld computers or computers connected via a network, such as the Internet. Further, commercial software packages may be used to provide some or all of the software used to implement the method. Those skilled in the art would know the type of commercial packages that may be used to implement the method shown in FIG. 4 and would also understand how to implement preferred embodiments of the present invention from the description herein.

FIG. 4 shows a segmentation step 451 of the method that comprises the segmentation of the geographic information in the map or maps used for data display. Typically, a map display comprises a raster image of the displayed geography. The raster image may also include additional information, such as coloring for terrain indication. Therefore, raster images 401 showing maps or other information are provided at the first step. Segmentation is accomplished by a hierarchy of vector representations of political and geographic boundaries. Hence, vector maps 403 containing the vector representations are also provided at the first step.

Figure 5:
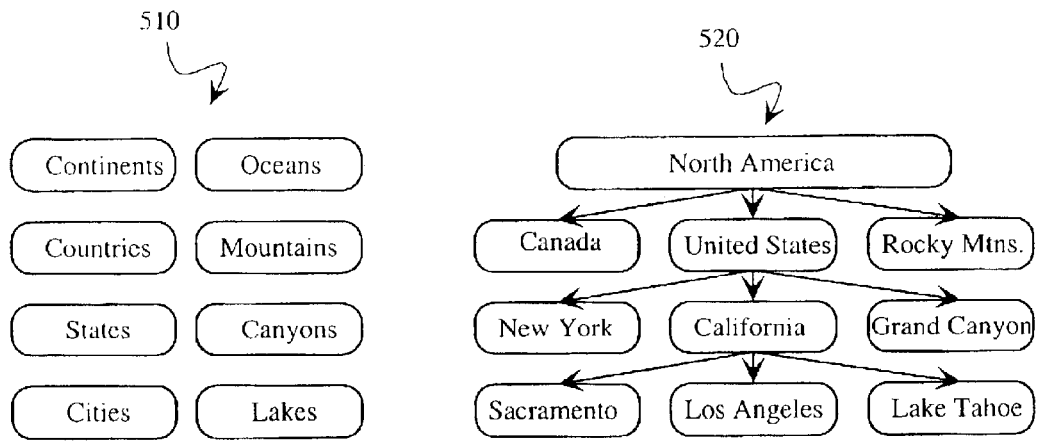
FIG. 5 shows a diagram of an exemplary hierarchical organization of geographic elements, which may be used by embodiments of the present invention.

As noted above, the vector maps contain boundary representations of political, geographic, or map entities. FIG. 5 shows one possible collection of geographic entities 510 that may be used within embodiments of the present invention. Other collections of map entities may be used. Also, the entities may project as deep as incorporating much smaller geographic entities, such as streets and buildings.

Also, as noted above, the entities within the vector maps are organized in a hierarchical fashion. The topmost level of the hierarchy represents the largest geographic entities in the original map projection. If a Mercator map of the Western Hemisphere is considered, the largest entities might be continents and oceans. FIG. 5 depicts a possible hierarchical organization 520 of the map entities for the Western Hemisphere. As shown in FIG. 5, the topmost vector representation may be the North American continent. The vector representations of the countries of Canada and the United States would be considered to be lower in the hierarchy than the North American continent representation, but would be linked to that representation.

As noted, vector representations of the geographic entities are used to divide the underlying map imagery into logical segments. Preferably, the image segmentation is performed automatically, such that no user intervention or selection of image segments is required. Image segmentation creates multiple segments, where each segment represents a political or geographical entity. Image segmentation should also preserve the hierarchical organization of the map imagery discussed above. As shown in FIG. 4, a user input 411 may be used to select the level at which the image segmentation is to be performed. For example, segmentation of the United States into individual states may be all that is required, so that the additional processing to segment the states into individual cities and/or counties is avoided.

Preferably, pixel selection techniques are used to segment the source imagery in the raster image into segments using the vector representations as selection boundaries. There are known pixel selection techniques that accomplish the segmentation of the underlying map into logical segments. For example, rubberband pixel selection algorithms known in the art may be used to perform the segmentation. Other techniques may also be used to segment the map imagery, such as the rasterization techniques described in U.S. Pat. No. 5,386,509, U.S. Pat. No. 5,528,733, and U.S. Pat. No. 5,544, 294, all of which are incorporated herein by reference.

After the map segmentation step 451, FIG. 4 shows a data registration step 453. In the registration step 453, overlay data 413 is associated with and linearly registered to each logical segment. The overlay data includes information that has an association with the logical segments. The overlay data may be essentially any information entity that can have a geospatial component, including text, labels, three-dimensional models, additional maps, streaming video objects, etc. The overlay data 413 is positioned geospatially with respect to a user-specified level of the hierarchy of logical segments. Therefore, the data registration step 453 provides a linear registration of the overlay data to the logical segments. The overlay data 413 may be associated and registered with any level of the hierarchically organized image segments, depending upon the information contained in the data or a pre-existing data association. For example, as discussed above, there may be logical image segments for both the United States and for the individual states. Thus, a data overlay association may be made that associates and registers data related to a country-wide phenomena to the United States logical segment, while data related to state-wide phenomena may be associated and registered with each individual state with the United States.

After the map segmentation 451 and data registration 453 steps are performed, the map imagery is ready for transformation. Note that the transformations performed on a logical segment are also performed on the associated overlay data. The transformations may be applied to each logical segment independently or to groups of segments. In the preferred method, the transformations are driven by the density factor of the overlay data, as described below. However, any number of factors may be used to determine the transformation to be applied to the logical segments with the map. For example, the transformation may depend upon the data density in each segment at each level of the hierarchy and the display space; regional importance; position, size, and shape of adjacent segments; effect of the transformation on segments higher in the hierarchy, and/or other factors. The effects of the transformation will be realized on both the map imagery and the overlay data. Preferably, the transformation distortions on segments higher in the hierarchy are minimized to help preserve recognition of geography by maintaining salient features. It is also preferable that the relative positions of segments at the same level in the hierarchy are approximately maintained. The transformation may also provide that logical segments may be replaced by lower level of detail representations.

As noted above, a preferred method of the present invention relies on the density of the overlay data to determine the map transformations to be made. Hence, FIG. 4 shows a density calculation step 457. Since the logical segments comprise raster areas, each logical segment i has a segment-PixelArea$_i$ factor associated with it. The segmentPixelArea$_i$ factor may simply be a count of the number of pixels within the displayed logical segment, or some other value that is proportional to the area of the logical segment. Since the overlay data is registered to the logical segments on a segment-by-segment basis, there is also a factor overlaypixelArea$_i$ that indicates the amount of overlay data registered to each logical segment. If the overlay data within a logical segment is registered to the segment on a pixel-by-pixel basis, overlaypixelArea$_i$ is simply a count of the number of pixels within a segment that have overlay data registered to them. As indicated in FIG. 4, the area factors 417 are used in the density calculation step 457 in the calculation of the density of the overlay data segmentDensity$_i$. The calculation of segmentDensity$_i$ is performed using the equation:

$$segmentDensity_i = \frac{overlayPixelArea_i}{segmentPixelArea_i}, segmentPixelArea_i > 0$$

After the segmentDensity$_i$ is calculated for each logical segment, FIG. 4 shows that the logical segment scaling step 459 is performed. The density of the overlay data is compared between the logical segments. Based on the relative densities, the area of the logical segment is scaled up or down. If, for example, segmentDensity$_i$ is small, segmentPixelArea$_i$ may be decreased, so that the area of that logical segment is decreased. On the other hand, if segmentDensity$_i$ is large, segmentPixelArea$_i$ may be increased, so that the area of that logical segment is increased. Hence, the areas of those logical segments that have a high density of overlay data, and thus probably are of greater interest, will be increased to provide better visualization of those areas. However, the user may wish to specify the minimum or maximum size of any particular logical segment or of all the logical segments, therefore size factors 419, minimumSize and/or maximumSize, may be used in the scaling performed in the scaling step 459. Further, segmentDensity$_i$ may be compared to a set factor to determine whether it is large or small.

However, simply scaling the logical segments will probably not provide enhanced visualization of the map displays and overlay data. In fact, if only scaling is performed, it is likely entire logical segments or portions thereof will be hidden by other logical segments. Therefore, in preferred embodiments of the present invention, the logical segments are repositioned after scaling is performed to help ensure that the logical segments are still viewable. FIG. 4 shows a repositioning step 461. In the repositioning step 461, the scaled logical segments are moved so that they may still be viewed.

Various algorithms may be used to perform the calculations used reposition the logical segments. A preferred algorithm is based on moving the logical segments according to their positional relationship to the center of mass of a parent logical segment. As discussed above, the logical segments are preferably organized in a hierarchy. Therefore, the scaled logical segments should all be children of a single parent logical segment. Repositioning the child segments based on their relationship to the center of mass defined by the area of the parent segment will help retain the positional relationships between the child segments.

With logical segment repositioning based on the center of mass, each logical segment is moved incrementally toward or away from the center of mass of the parent segment and, if necessary, rotated in relation to the center of mass. However, it is also preferred that the logical segments be repositioned in a way that best retains the outline of the parent logical segment for the child logical segments. That is, if the child logical segments are tangential to the edge of the parent logical segment and the child logical segments do not overlap, the outline of the parent shape is retained, thus helping to preserve the recognition of the parent logical segment.

As shown in FIG. 4, three factors 421, intersectionRatio, thresholdDistance, and thresholdAngle, may be used to determine the extent of repositioning. The ratio of overlap between the logical segment and the parent segment is calculated. This ratio, computedRatio, determines the direction of repositioning in relation to the center of mass. If the computed ratio is less than a set parameter, intersectionRatio, the logical segment is repositioned towards the center of mass of the parent segment. If the computed ratio is more than intersectionRatio, the segment is repositioned away from the center of mass. However, a maximum distance, thresholdDistance, may be specified to limit the distance that a logical segment can be repositioned away from the center of mass.

Figure 7:
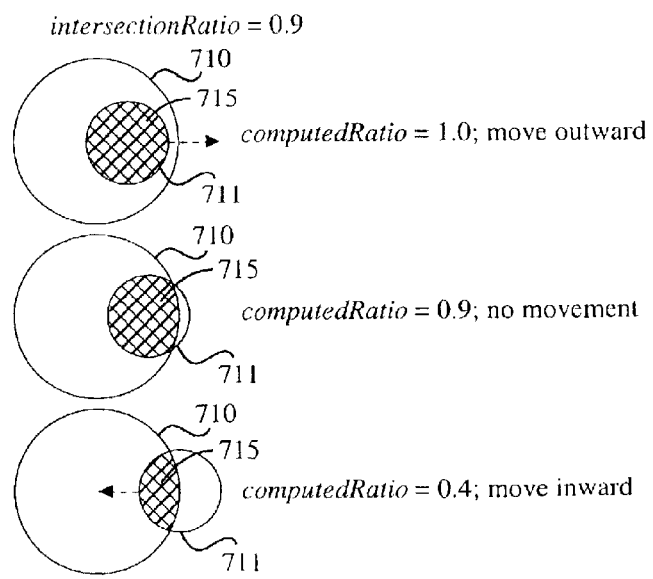
FIG. 7 shows examples of how the child logical segments are relocated based on the computer overlap ratio according to an embodiment of the present invention.

FIG. 7 shows examples of how a child logical segment may be viewed in relation to a parent logical segment based on the computedRatio and the intersectionRatio. In FIG. 7, intersectionRatio is shown to be 0.9. This value for intersectionRatio may be based on a user specified parameter, characteristics of the map to be displayed, or on other parameters or characteristics that support the preference that the logical segments are disposed in a manner that best preserves the recognition of the parent segment. The ratio of overlap, computedRatio, may be calculated as follows:

ComputedRatio=overlappingPixelArea/logicalsegmentPixelArea

If a child logical segment 711 is completely within a parent logical segment 710, the overlap area 715 will be completely within the parent logical segment 710 and computedRatio will necessarily be 1.0. Since intersectionRatio is 0.9 and computedRatio>intersectionRatio, the child segment 711 is preferably moved away from the center of mass of the parent segment 710. On the other hand, if, after scaling, the child logical segment 711 is positioned where the overlap area 715 is only a fraction of the child logical segment 711, computedRatio will be less that 1 and may be less than intersectionRatio. If computedRatio<intersectionRatio, the child logical segment 711 is preferably moved towards the center of mass of the parent logical segment 710. Finally, if computedRatio=intersectionRatio, no movement of the child logical segment 711, in relation to the center of mass of the parent logical segment 710, is made.

As noted above, the child logical segment may be rotated around the center of mass of the parent logical segment. Thus, a logical segment may be repositioned so that the logical segment has a different angular position, when measured in relation to the center of mass. A maximum angular change, thresholdAngle, may be specified to limit the rotational repositioning of a logical segment. Preferably, the distance and angle parameters are minimized during the computation of the new position and bounded as $0 \leq distance \leq thesholdDistance$ and $0 \leq angle \leq thresholdAngle$.

After repositioning the logical segments, the logical segments are checked to see if adjacent logical segments overlap and, therefore, obscure the complete display of each logical segment. FIG. 4 shows a checking step 463, where the logical segments are checked to determine if they intersect. Preferably, if any of the logical segments intersect, the logical segments are resealed and repositioned. As shown in FIG. 4, if there is an intersection between logical segments, the density calculation step 457 and subsequent steps are repeated.

If there is no intersection between the logical segments, the transformation of the map has been completed. The user may then be prompted to change the map parameters or the map to be displayed, as shown by the final step 465 in the flow chart depicted in FIG. 4.

Figure 6A:
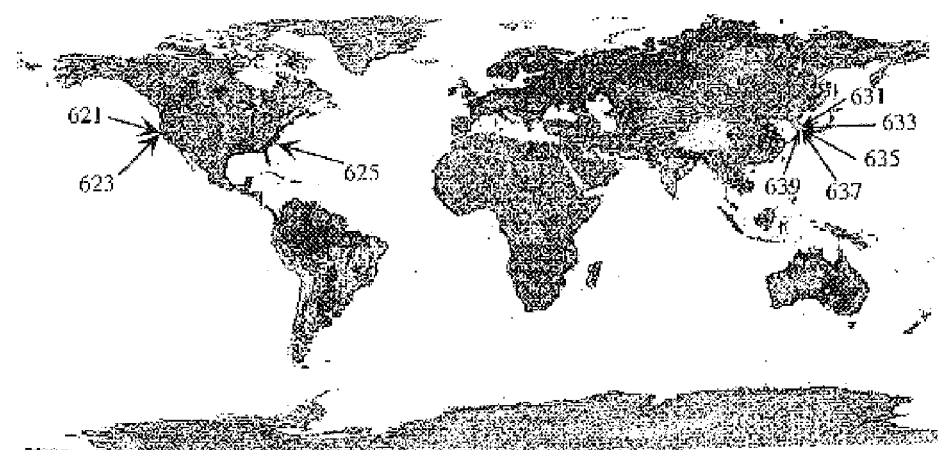
FIG. 6A shows a map of the world using a conventional transformation of polar coordinates to Cartesian coordinates, where the map is overlaid with data related to certain geographic regions.
Figure 6B:
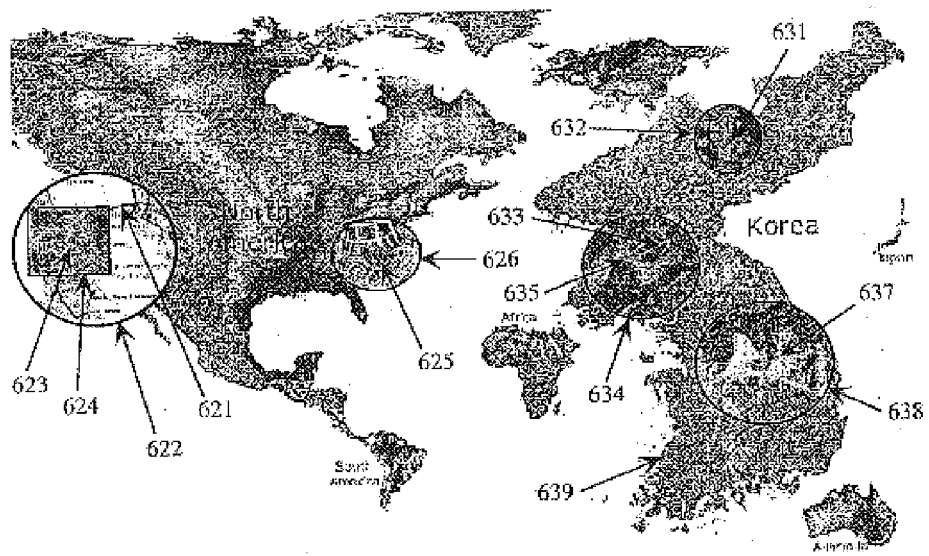
FIG. 6B shows a map of the world using a transformation according to an embodiment of the present invention, in which geographic regions with higher data density are presented in greater detail.

FIGS. 6A and 6B provide an example of a transformation according to the present invention performed on a global scale. In FIG. 6A, a map of the entire world is provided, but only events occurring in the United States and Korea are of interest. Hence, the United States and Korea may be considered as logical segments having a high data density, while other portions of the map are comprised of segments with low data density. FIG. 6A shows, for example, multiple events occurring on the West Coast of the United States, while, simultaneously, there is an event 625 occurring on the East Coast. There are also multiple events, 631, 633, 635, 637, 639, occurring in East Asia. Due to the scale of the map shown in FIG. 6A, it is difficult to determine the geographic location of the events of interest, and the geographical relation of these events to other events within the same general locale. Further, the nature of these events can not be discerned from the map display. Using prior art techniques, if a user were to manipulate the map to "zoom" in on, for example, East Asia, the relevant data in the United States would no longer be displayed.

FIG. 6B shows an example of the map transformation that may be provided according to the present invention. In FIG. 6B, the displays of the United States and Korea are enlarged, such that the locations of events occurring within those areas may be displayed with greater detail. The display depicted in FIG. 6B shows an enlarged San Francisco area map display 622 from which it can be seen that one event 621 on the West Coast is occurring at a specific bridge. A further enlarged photo display 624 shows that the other event 623 on the West Coast is occurring at on a specific street. FIG. 6B also shows that the East Coast event 625 is occurring at a specific building, which is shown with a pictorial display 626. The events occurring in East Asia are shown with an enlarged display of Korea. Further enlarged regions 632, 634, and 636, are also used to show the nature of the events in Korea. It can be seen that a first East Asian event 631 is related to a specific city, a second event 633 is related to a specific road, a third event 635 is related to a specific village, and a fourth event 637 is related to a specific region. Finally, the fifth event 639 may be related to the entire country of South Korea.

One will note, however, that even with the enlargement of North America and Korea depicted in FIG. 6B, the salient features of other portions of the map, such as neighboring countries and continents, continue to be displayed, albeit at a decreased scale. These data dependent scaling of geographic features increases the display space available for critical data, while preserving an analyst's ability to recognize geography, and presents the data in a manner that supports data correlation. As indicated above, the scaling of the geographic features may depend on such factors as data importance, location, political boundaries, geographic features, display space, information density, and human limits of recognition in the presence of alteration.

Regarding FIG. 6B, one might think that the surrounding geography, such as Japan or South America, might be eliminated from the display, since, as shown in FIG. 5A, these areas do not contain any data of interest. However, this idea assumes the analyst or decision-maker has advance knowledge of the location and relationships among data, and an intimate understanding of the geographic regions involved. More often, analysts are seeking to establish these connections and may consider regional data and effect in their analyses. Further, embodiments of the present invention allow analysts to view the transformation of a map based on one set of factors to a transformation based on a different set of factors and to, therefore, gain additional contextual information as the change in transformation is performed. For example, the geographic scaling of a first map may be dependent upon the number and location of presumed sources of computer viruses, while the geographic scaling of a second map may be dependent upon the number and location of computer installations reporting attacks by computer viruses. Viewing the display as it changes from the first transformation to the second transformation may provide an analyst with an idea as to how computer viruses spread from source to destination.

Figure 8:
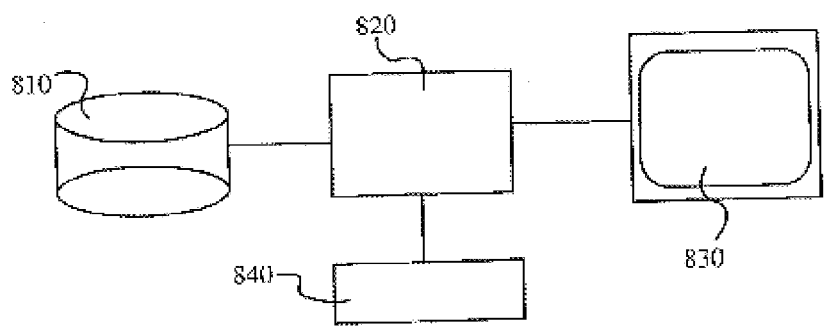
FIG. 8 shows a block diagram of a computer system according to an embodiment of the present invention.

Embodiments of the present invention may be provided by a computer based system that executes either commercially available or custom designed software. FIG. 8 depicts a typical computer system that may be used in an embodiment of the present invention. Vector maps and other map-based data may be stored in a storage device 810, such as a disk drive, tape drive, solid state memory, or other storage devices known in the art. The storage device 810 may also store raster images of maps and other data. Finally, the storage device 810 may also store the geospatially-based data of interest. A processor 820, for example, a commercially available processor such as a Pentium® from Intel Corporation, is coupled to the storage device 810 to receive the map data and other data. The processor 820 executes the computer-based commands needed to implement the geographic transformation according to the present invention. A user input device 840, such as a keyboard, is used to provide user-specified data and commands to the processor 820. A display device 830, such as a computer monitor, provides a display of a map transformed according to the present invention.

From the foregoing description, it will be apparent that the present invention has a number of advantages, some of which have been described above, and others of which are inherent in the embodiments of the invention described above. Also, it will be understood that modifications can be made to the apparatus and method described above without departing from the teachings of subject matter described herein. As such, the invention is not to be limited to the described embodiments except as required by the appended claims.

What is claimed is:

1. A method for enhancing the display of geospatially-based data on a map, wherein said geospatially-based data is associated with map-based entities, said method comprising:
   (a) specifying a hierarchy for the map-based entities shown on a map;
   (b) segmenting the map into logical segments based on the hierarchy of map-based entities;
   (c) associating the geospatially-based data with corresponding logical segments;
   (d) calculating a corresponding scale factor for each logical segment;
   (e) scaling each logical segment according to the corresponding scale factor;
   (f) repositioning each logical segment to minimize intersections between each logical segment and any other logical segment; and
   (g) displaying a map of the scaled and repositioned logical segments.

2. The method of claim 1, wherein each corresponding logical segment comprises an area of pixels and wherein associating the geospatially-based data comprises linearly registering the geospatially-based data to one or more pixels within the corresponding logical segment.

3. The method of claim 2, wherein calculating the corresponding scale factor comprises determining a corresponding segment density factor based on the ratio of the number of pixels within the corresponding logical segment to which geospatially-based data has been registered to the total number of pixels in the area of pixels for the corresponding logical segment.

4. The method of claim 3, wherein scaling each logical segment comprises increasing the area of pixels for the corresponding logical segment if the corresponding scale factor is greater than a specified value and decreasing the area of pixels for the corresponding logical segment if the corresponding scale factor is less than a specified value.

5. The method of claim 1, further comprising repeating operations set forth in subparagraphs (d) through (f) until no logical segment intersects any other logical segment.

6. The method of claim 1, wherein segmenting the map into logical segments comprises segmenting raster imagery with vector maps to provide logical segments comprising areas of pixels.

7. The method of claim 1, wherein every logical segment has a single parent segment and wherein repositioning each logical segment comprises repositioning each logical segment in relation to a center of mass of the parent segment.

8. The method of claim 1 wherein the corresponding scale factor comprises at least one factor calculated from the group of factors consisting of data importance, location, political boundaries, geographic features, and display space.

9. A computer-readable medium having computer-executable instructions for performing the method according to claim 1.

10. A computer system using computer-executed instructions for performing the method of claim 1, the system comprising:
    a processor for executing the computer-executed instructions;
    a display device coupled to said processor;
    a user input device coupled to said processor, said user input device transferring user commands and data to said processor; and
    a storage device coupled to said processor.

11. A method for scaling a map based on associated overlay data, the method comprising:
    (a) intersecting vector representations of a plurality of geographical or political entities with one or more raster images to create a plurality of logical data segments, each logical data segment corresponding to the vector representation of a corresponding geographical or political;
    (b) linearly registering overlay data to each logical segment;
    (c) calculating a corresponding data density for each logical segment;
    (d) scaling each logical segment based on the corresponding data density for the logical segment;
    (e) repositioning at least one logical segment in relation to another logical segment;
    (f) determining whether any logical segment overlaps any other logical segment; and
    (g) providing a map containing the scaled logical segments.

12. The method of claim 11, wherein operations set forth in subparagraphs (c) through (f) are repeated until no logical segments overlap any other logical segment.

13. The method of claim 11, wherein each logical segment comprises pixels and has a corresponding segment pixel area and wherein scaling each logical segment further comprises scaling the corresponding segment pixel area.

14. The method of claim 13, wherein calculating a corresponding data density further comprises calculating a corresponding segment data density from the ratio of an overlay pixel area factor to a segment pixel area factor.

15. The method of claim 14, wherein scaling each logical segment comprises:
    specifying a density ratio factor;
    comparing the corresponding segment data density for each logical segment to the density ratio factor;
    increasing the segment pixel area for the logical segment if the segment data density for the logical segment is greater than the density factor; and
    decreasing the segment pixel area for the logical segment if the segment data density for the logical segment is less than the density factor.

16. The method of claim 15, wherein a maximum pixel area and a minimum pixel area is specified and the segment pixel area is maintained between the maximum pixel area and the minimum pixel area.

17. The method of claim 11 wherein the logical segments have a hierarchical organization with each logical segment having a parent segment and the parent segment being the same for each logical segment, the parent segment having a center of mass and wherein repositioning at least one logical segment comprises at least one of the following:
    moving the at least one logical segment incrementally toward or away from the center of mass;
    moving the at least one logical segment angularly around the center of mass; and
    moving the at least one logical segment incrementally toward or away from the center of mass and moving the at least one logical segment angularly around the center of mass.

18. The method of claim 17 wherein a calculated overlap ratio is calculated for each logical segment, the calculated overlap ratio being a ratio of an overlap between the logical segment and the parent segment, and the at least one logical segment is moved towards the center of mass if the overlap ratio is less than a specified intersection ratio and the at least one logical segment is moved away from the center of mass if the overlap ratio is greater than the specified intersection ratio.

19. The method of claim 17, wherein a maximum distance and maximum angle is specified and the at least one segment is moved a distance less than the specified maximum distance and the at least one segment is moved angularly at an angle less than the maximum angle.

20. A computer-readable medium having computer-executable instructions for performing the method according to claim 11.

21. A computer system using computer-executed instructions for performing the method of claim 11, the system comprising:
- a processor for executing the computer-executed instructions;
- a display device coupled to said processor;
- a user input device coupled to said processor, said user input device transferring user commands and data to said processor; and
- a storage device coupled to said processor.

* * * * *